United States Patent
Maheshwari et al.

(10) Patent No.: US 7,603,398 B2
(45) Date of Patent: Oct. 13, 2009

(54) DATA CONVERTER AND A DELAY THRESHOLD COMPARATOR

(75) Inventors: Atul Maheshwari, Portland, OR (US); Sanu K. Matthew, Hillsboro, OR (US); Mark A. Anders, Hillsboro, OR (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 11/094,811

(22) Filed: Mar. 31, 2005

(65) Prior Publication Data

US 2006/0221724 A1 Oct. 5, 2006

(51) Int. Cl.
*G06F 7/00* (2006.01)
*G06F 15/00* (2006.01)

(52) U.S. Cl. ........................................ 708/210; 708/203
(58) Field of Classification Search ........................ None
See application file for complete search history.

(56) References Cited

U.S. PATENT DOCUMENTS

2003/0202438 A1* 10/2003 Nomoto ................... 369/44.41

* cited by examiner

*Primary Examiner*—Lewis A Bullock, Jr.
*Assistant Examiner*—Mark A Gooray
(74) *Attorney, Agent, or Firm*—KED & Associates LLP

(57) ABSTRACT

For one disclosed embodiment, a converter converts $2^N$-bit data into an N-bit value indicating a number of bits in the data that have a predetermined logical value. The converter includes N comparators, each determining whether the number of bits in the data having the predetermined logical value exceeds a respective one of a plurality of reference values. The N-bit value is generated based on the outputs of the comparators. For another disclosed embodiment, a first delay element delays a signal based on a number of bits in a data value having a predetermined logical value, and a second delay element delays the signal based on a number of bits in a reference value having the predetermined logical value. A comparator then generates a bit value based on the delayed signals.

30 Claims, 12 Drawing Sheets

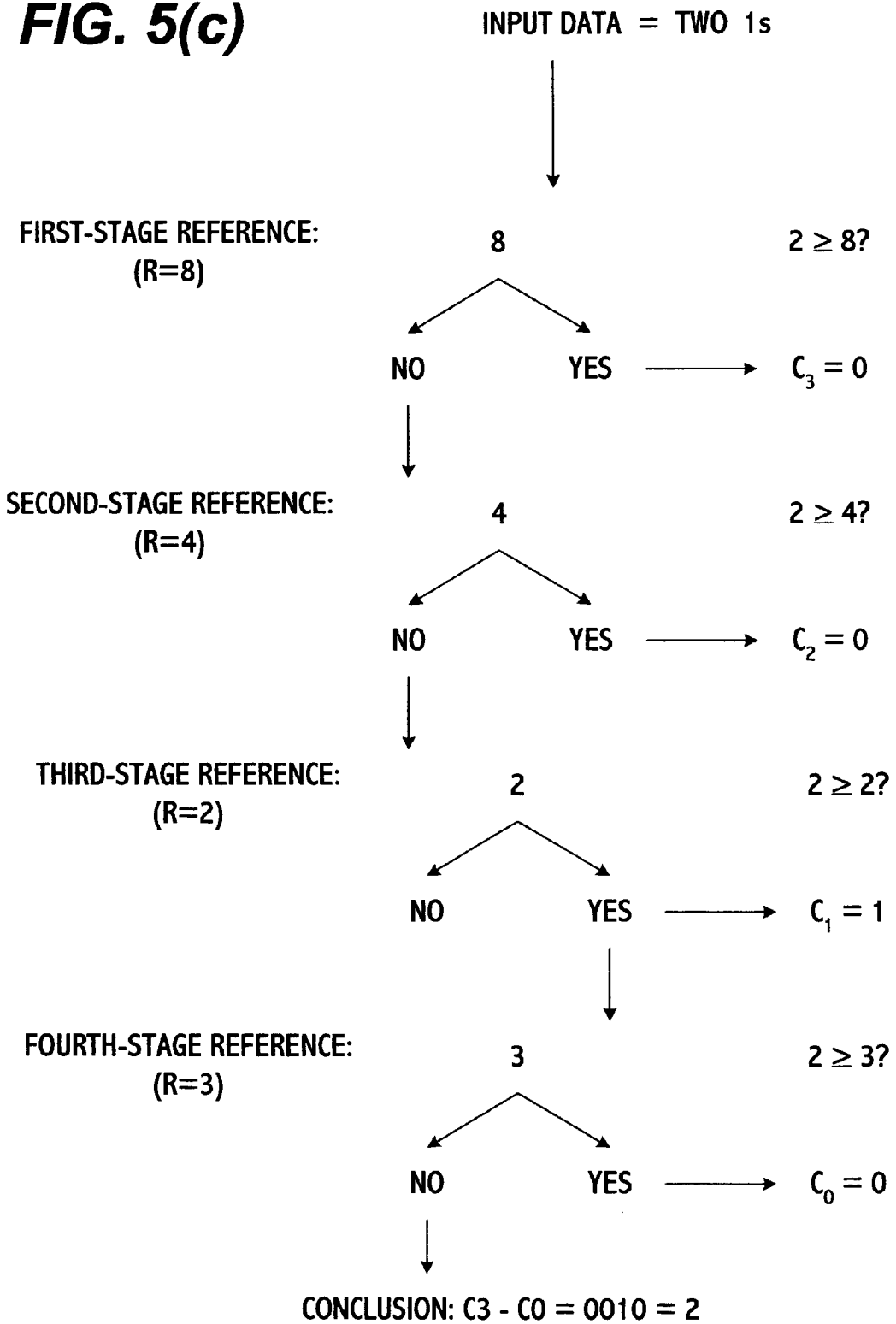

US 7,603,398 B2

DATA CONVERTER AND A DELAY THRESHOLD COMPARATOR

FIELD

One or more embodiments of the present invention relates to electrical circuits for performing arithmetic operations.

BACKGROUND

Arithmetic logic units use banks of multipliers to perform logic operations. When generating the product of two binary numbers, each multiplier forms a plurality of partial products which, first, are compressed for space and processing efficiency and, then, are added to form the final product of the two numbers. Compression of the partial products is the most significant operation in the multiplier in terms of delay and power.

In many multiplier circuits, full adder blocks are used to compress the partial products prior to their summation. These blocks (known as 3:2 and 4:2 compressors) are power inefficient and slow, especially when large bit numbers are multiplied. This is because the delay time for obtaining the product increases linearly with bit length.

BRIEF DESCRIPTION OF THE DRAWINGS

FIG. 5C shows an example of compressed bits generated from data having 2 logical 1s.

DETAILED DESCRIPTION

Figures 1, 2:
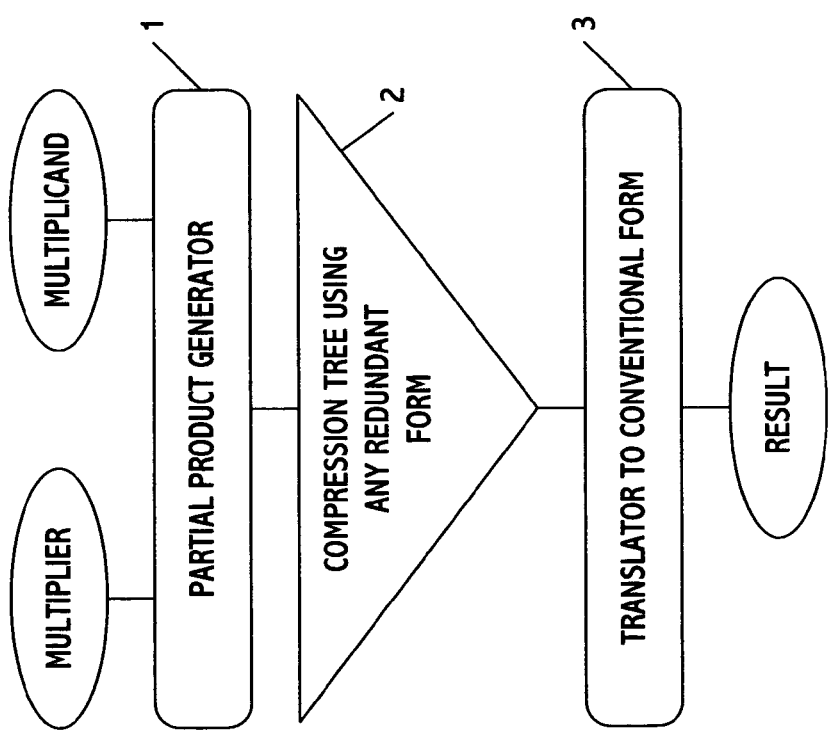
FIG. 1 is a diagram showing a multiplier circuit.
FIG. 2 is a diagram showing binary results produced at various stages of the multiplier circuit.

FIG. 1 shows a multiplier circuit formed from a partial product generator 1, a compression tree 2, and a translator 3 which outputs the product of a multiplier and a multiplicand. The partial product generator outputs a series of partial products that are compressed by the compression tree. The compressed products are then added by the adder and translated to yield the product. The translator may be an adder circuit, although other translation circuits may be used.

FIG. 2 shows the output of each stage of the multiplier circuit, with the multiplier and multiplicand represented by reference numeral 10, the partial products represented by reference numerals $20_1$ to $20_6$, and the product represented by reference numeral 30. For illustrative purposes, the case of 6-bit multiplication is shown. However, this concept applies equally to multiplication of other bit numbers. Also, in FIG. 2, 0s are used to show the position of binary numbers at each stage of the circuit output.

Figure 3:
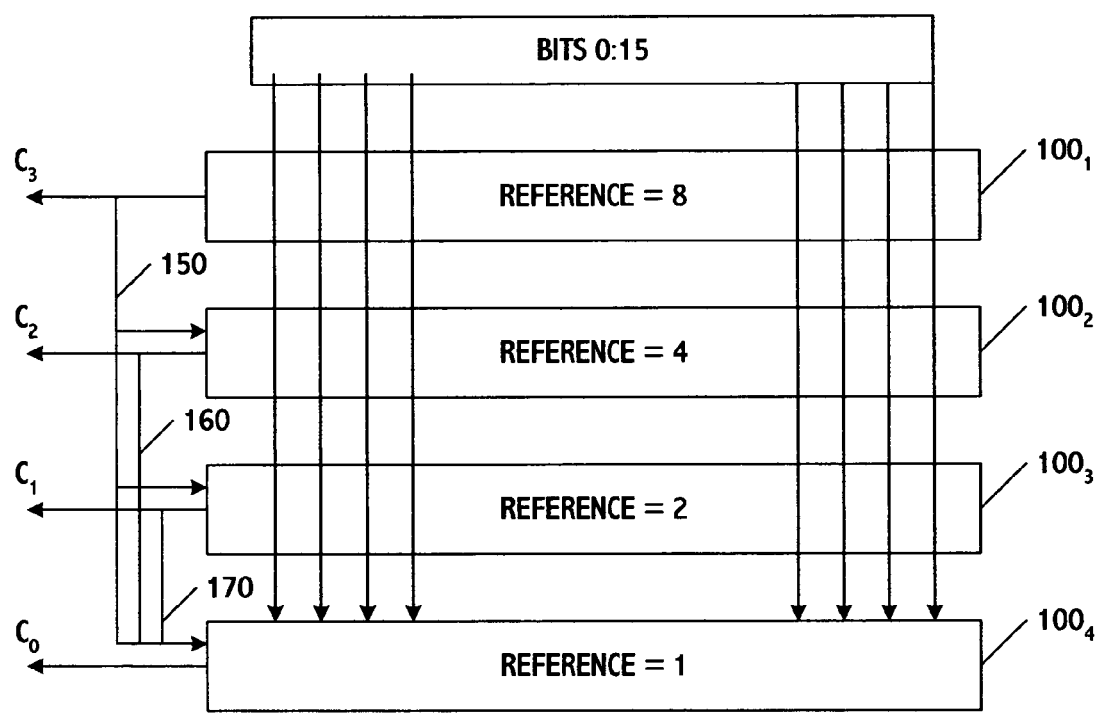
FIG. 3 is a diagram of a compressor according to one embodiment of the present invention.

FIG. 3 shows an M-bit to N-bit compressor in accordance with one embodiment of the present invention. For illustrative purposes, the compressor is shown as converting 16-bit data into 4-bit data corresponding to bits $C_3$ to $C_0$. M and N, however, may be other bit numbers depending on the application. Also, when implemented in a multiplier, a plurality of compressors may be used to compress respective partial products prior to their summation. This multiplier application, while beneficial, is just one of many possible applications of the compressor, i.e., the compressor of FIG. 3 may be used in any circuit which performs data compression including but not limited to spatial encoders, priority encoders, and majority voters. Moreover, the compressor may replace any circuit which requires counting a logical value (e.g., a logical 1) in a data block.

The compressor includes a plurality of stages respectively formed from a same number of delay threshold comparators. The delay threshold comparators collectively perform a binary search operation which involves comparing the bits of input binary data value to different reference values. The reference value for each stage is different, and binary results of the comparisons correspond to compressed data bits $C_3$ to $C_0$. The comparisons performed in each stage may be conceptually understood with reference to FIG. 4 which shows one example of the delay threshold comparator, and FIG. 5A which specifies functional blocks included in a data compression method of the present invention.

In a 16-bit to 4-bit implementation, a delay threshold comparator in a first stage $100_1$ of the compressor compares a 16-bit binary data value to a first reference value. (B200). In performing this comparison, the first-stage comparator determines whether the data value has the same or more logical 1s than the reference value. In this example, the reference value is equal to half the number of input data bits, e.g., 8. Therefore, stage $100_1$ determines whether the number of logical 1 bits in the input data $\geq 8$. This may be accomplished as follows.

Figure 4:
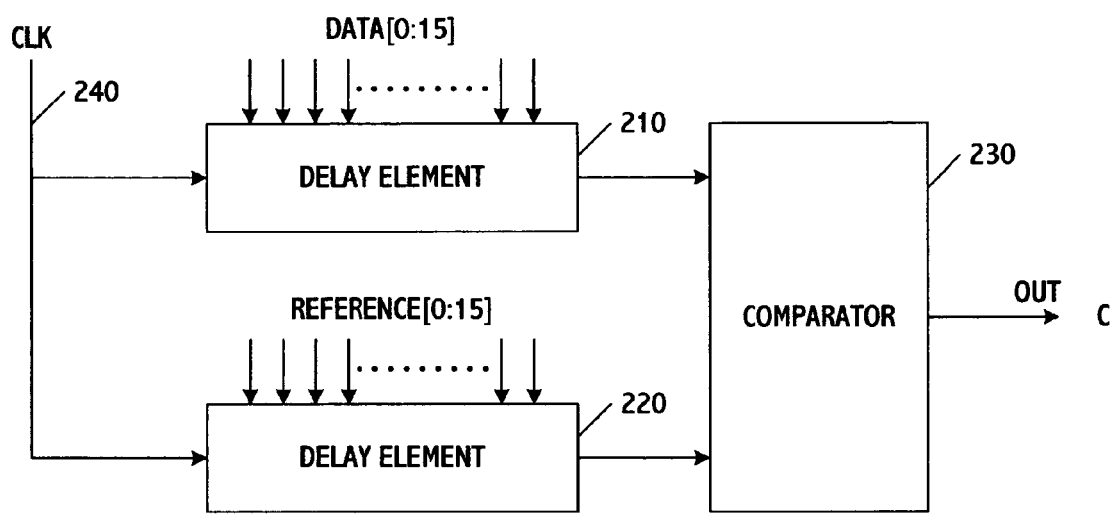
FIG. 4 is a diagram showing one type of circuit configuration that may be used to implement the delay threshold comparators in each stage of the compressor.
Figure 5A:
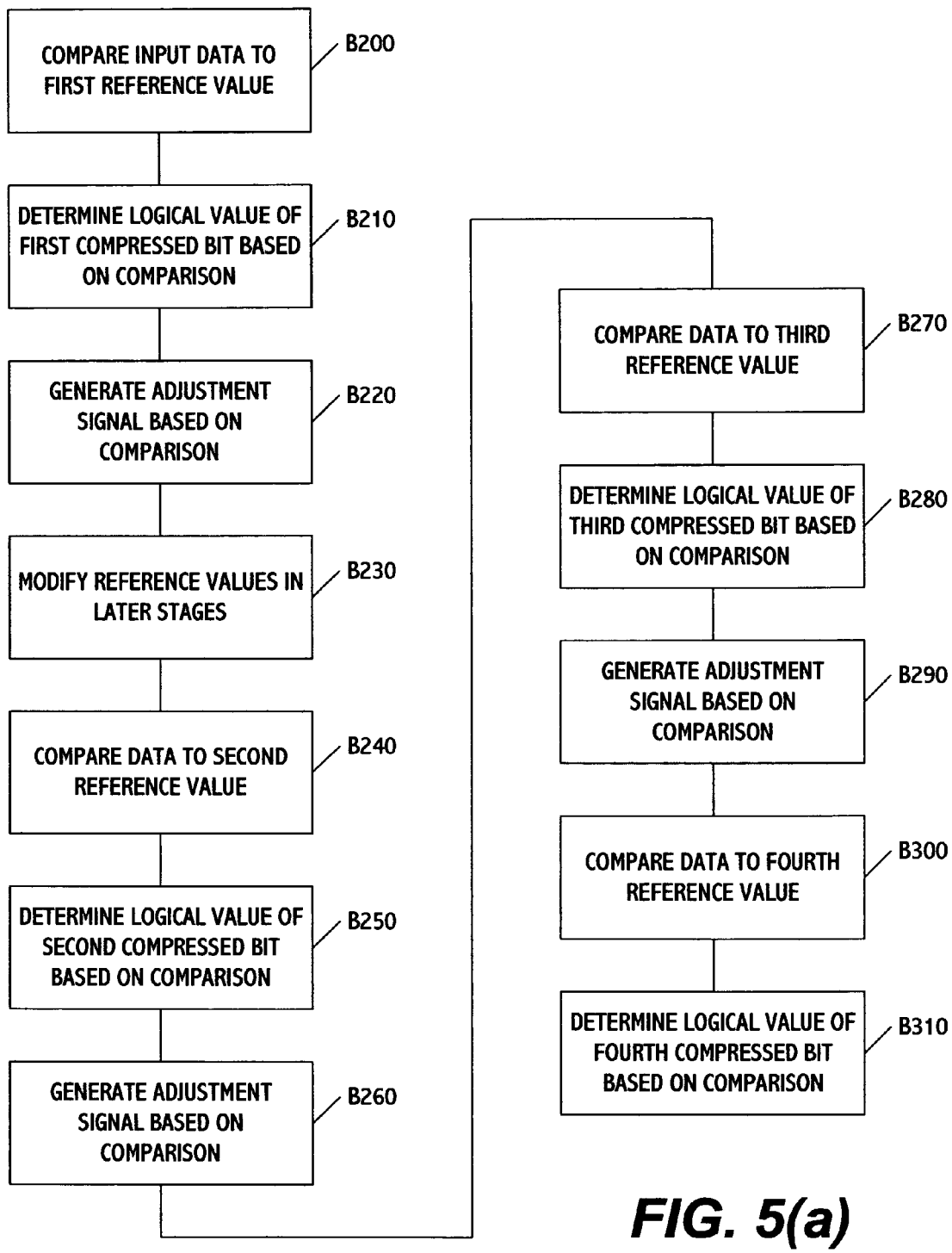
FIG. 5A is a flow diagram showing functional blocks included in a data compression method in accordance with one embodiment of the present invention.

Based on the number of 1s in the input data, the clock signal passed through the first (data) delay element will arrive before or after the clock signal passed through the second (reference) delay element. (FIG. 4). Thus, if the input data has more 1s than the reference number in the second delay element, the delayed clock signal from the first delay element will arrive before the delayed clock signal from the second delay element. Conversely, the delayed clock signal from the first element will arrive after the delayed clock signal from the second element if the number of 1s in the input data is fewer than the reference value. If the number of 1s in the input data is equal to the reference number, then the delayed clock signals will arrive at substantially the same time.

The result of this comparison determines the logical value of the first compressed bit, $C_3$. (B210). If the number of 1s in the input data is equal to or greater than the first reference value (e.g., 8), then the value of compressed bit $C_3$ is 1. Conversely, if the number of 1s in the input data is less than the first reference value (e.g., 8), then the value of compressed bit $C_3$ is 0.

The result of the comparison in the first stage is also used to generate an adjustment signal 150, which is input into the remaining stages of the compressor. (B220). This adjustment signal preferably corresponds to compressed bit $C_3$ whose value is used to determine the reference values for the remaining stages. (B230). For example, if the first-stage comparator determines that the number of logical 1s in the input data≧8, the value of adjustment signal 150 causes the comparators in the remaining stages to set their reference values to ones greater than 8. Conversely, if the first-stage comparator determines that the number of logical 1s in the input data <8, the value of adjustment signal 150 causes the comparators in the remaining stages to set their reference values to ones less than 8.

The second-stage comparator compares the 16-bit data value to the second reference value, which has been set based on the value of adjustment signal 150. (B240). The second reference value is set to determine how many additional or fewer 1s are contained in the input data value than the first reference value. Thus, if the first-stage comparison indicates that the data value has a number of 1s<8, then the second stage comparator determines whether the number of 1s in the data is greater than the second reference value, which in this case is 4. Conversely, if the first-stage comparison indicates that the data value has a number of 1s≧8, the second stage comparator determines whether the number of is in the data is greater than the second reference value, which in this case is 12.

The result of the comparison performed in the second-stage comparator determines the logical value of the second compressed bit, $C_2$. (B250). If the number of 1s in the input data is equal to or greater than the second reference value, then the value of compressed bit $C_2$ is equal to logical 1. Conversely, if the number of 1s in the input data is less than the second reference value, the value of $C_2$ is a logical 0. This comparison also determines the value of a second adjustment signal 160 which is used by the remaining two stages 100₃ and 100₄ to set their respective reference values. (B260).

The third-stage comparator compares the 16-bit data value to the third reference value, which has been modified based on the value of adjustment signal 160. (B270). The third reference value is modified to determine how many additional or fewer 1s are contained in the input data value than the second reference value. Thus, for example, if the second-stage comparison indicates that the data value has a number of 1s<4, then the third-stage comparator determines whether the number of 1s in the data is greater than 2. And, if the second-stage comparison indicates that the data value has a number of 1s ≧12, then the third-stage comparator determines whether the number of 1s in the data is greater than 14.

The result of the comparison performed in the third-stage comparator determines the logical value of the third compressed bit, $C_1$. (B280). This comparison also determines the value of a third adjustment signal 170, which is used by the remaining stage 100₄ to set its reference value. (B290).

The fourth-stage comparator compares the 16-bit data value to the fourth reference value, which has been modified based on the value of adjustment signal 170. (B300). The fourth reference value is modified to determine how many additional or fewer 1s are contained in the input data value than the third reference value. Thus, for example, if the fourth-stage comparison indicates that the data value has a number of 1s<2, then the third-stage comparator determines whether the number of 1s in the data is greater than the fourth reference value. In the example given, the fourth-stage reference value is 1 when the third-stage comparator indicates that number of 1s is fewer than 2, and is 15 when the third-stage comparator indicates that the number of 1s is greater than or equal to 14.

The result of the comparison performed in the fourth-stage comparator determines the logical value of the fourth compressed bit, $C_0$. (B310). The compressed bits $C_3$-$C_0$ therefore provide a binary indication of the exact number of 1s in the input data.

Figure 5B:
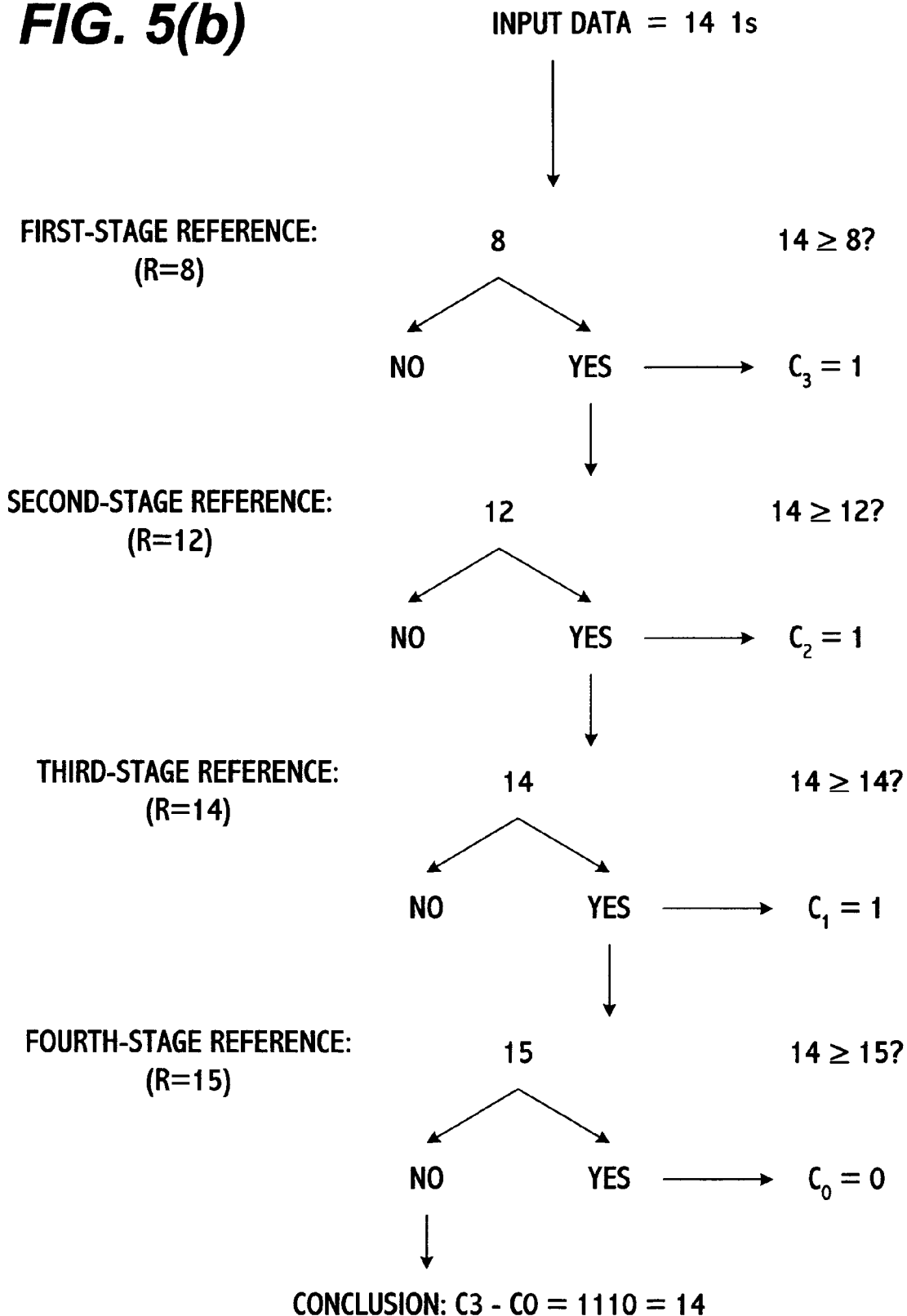
FIG. 5B shows an example of compressed bits generated from data having 14 logical 1s.

By way of example, FIGS. 5B and 5C show how the compressed bits are generated for cases where the input data has fourteen 1 s and two 1 s respectively. In these examples, when the number of 1s is greater than or equal to the reference value in any one stage, the corresponding output bit, C, is a logical 1 and the reference value in the next stage is added to the previous reference value. Conversely, when the number of 1s is less than the reference value in any one stage, the corresponding output bit, C, is a logical 0 and the reference value in the next stage is subtracted from the previous reference value. (The compressed bits may alternatively be considered to be converted bits as these bits represent the number of logical 1s in the input data, e.g., the input data is converted into a binary indication $C_3$-$C_0$ of the number of ones in the data).

Figure 5D:
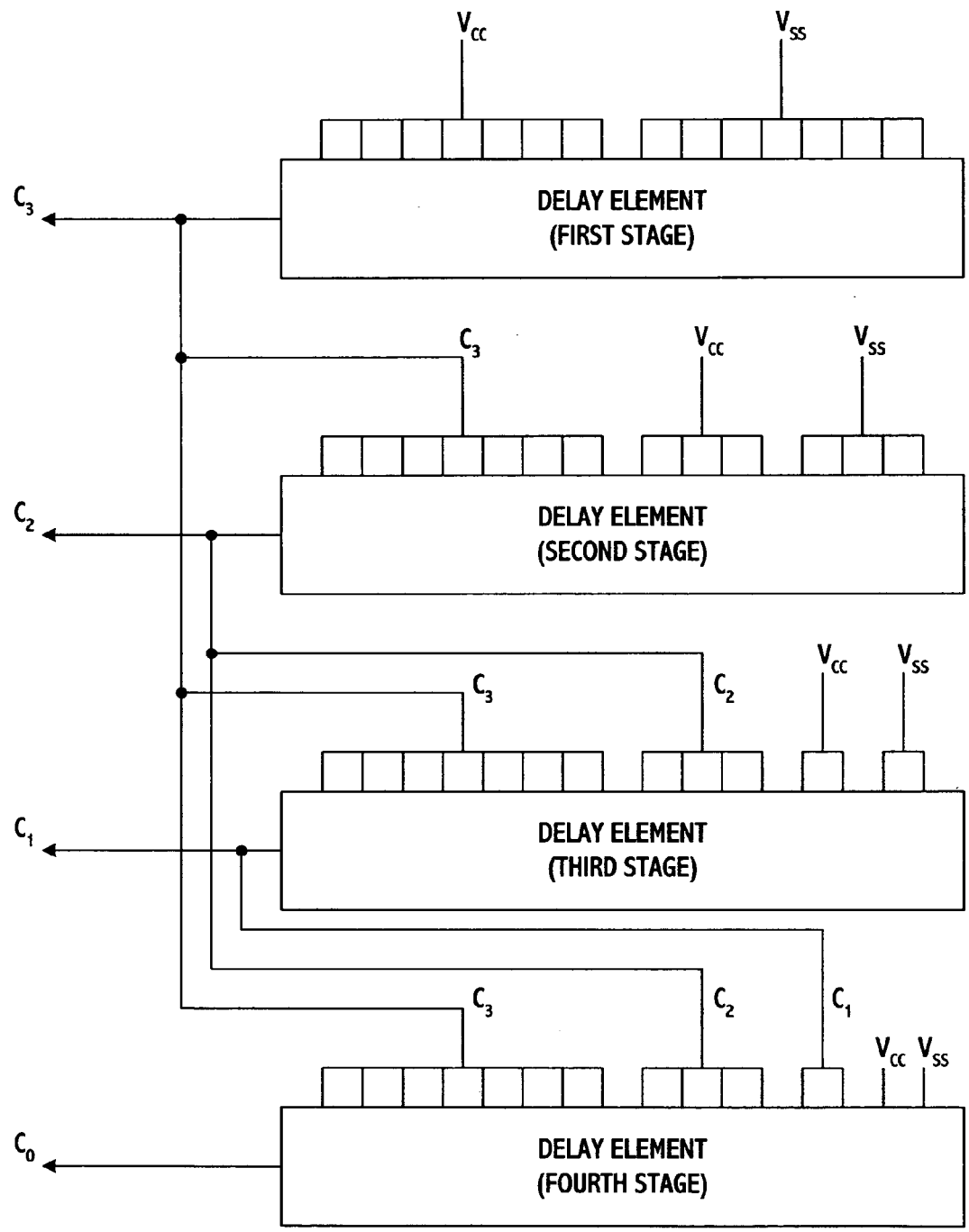
FIG. 5D shows how the reference values in each comparator stage are generated based on values of compressed bits from preceding stages.

As previously indicated, the adjustment signals output from stages 100₁ to 100₃ preferably correspond to compressed bits $C_3$ to $C_1$ respectively. These logical values may be used to determine, at least in part, the reference values of subsequent stages. For example, as shown in FIG. 4, the reference values for all stages may be represented by the same number of bits in the input data, which in this example is 16, e.g., bits [0:15]. Referring to FIG. 5D, the reference value of the first-stage comparator therefore has eight 1s and eight 0s in any order, with the ones being determined beforehand, for example, by coupling their respective signal lines to a supply voltage.

The reference value for the second-stage comparator is determined as follows: eight bits are set to receive the logical value of $C_3$, four bits are set to logical 1 by coupling their respective signal lines to the supply voltage, and 4 bits are set to logical 0 by coupling their respective signal lines to a reference potential, e.g., ground.

The reference value for the third-stage comparator is determined as follows: eight bits are set to receive the logical value of $C_3$, four bits are set to receive the logical value of $C_2$, two bits are set to logical 1 by coupling their respective signal lines to the supply voltage, and 2 bits are set to logical 0 by coupling their respective signal lines to the reference potential.

The reference value for the fourth-stage comparator is determined as follows: eight bits are set to receive the logical value of $C_3$, four bits are set to receive the logical value of $C_2$, two bits are set to receive the logical value of $C_1$, one bit is set to logical 1 by coupling its respective signal line to the supply voltage, and one bit is set to logical 0 by coupling its respective signal line to the reference potential.

The reference values for the second- through fourth-stage comparators may be summarized by the following equations:

$1^{st}$ Stage Reference Value=8

$2^{nd}$ Stage Reference Value=$4+8*C_3$ $3^{rd}$ Stage Reference Value=$2+4*C_2+8*C_3$ $4^{th}$ Stage Reference Value=$1+2*C_1+4*C_2+8*C_3$ wherein $C_3$, $C_2$, and $C_1$ have mathematical values equal to their logical values. Thus, if the input data has three ones, $C_3$-$C_0$=0011 and the $1^{st}$ to $4^{th}$ reference values will be 8, 4, 2, and 3 respectively.

The reference values for the second and subsequent stages may also be stated as:

$$\text{reference value}_x = \text{reference value}_{x-1} \pm 2^{N-X}$$

where X=2, ..., N and reference value$_{x-1}$ is equal to a preceding reference value. In this equation, the term $2^{N-X}$ is added to the preceding reference value if the number of 1s exceeds the preceding reference value and is subtracted from the preceding reference value if the number of 1s does not exceed the preceding reference value. Also, in this case the first reference value, reference value, may be expressed as $2^{N-1}$. In this embodiment, N equals the number of bits in the converted value. In other embodiments, N may correspond to a different number of bits.

The compressor, thus, takes an iterative approach to determining exactly how many 1s are in the data value and, then, outputs a corresponding compressed value, $C_3$-$C_0$. The approach is based on performing a binary search for 1s in the input data, with each stage performing a finer and finer search. The first compressed bit ($C_3$) indicates whether the number of 1s are in the upper or lower half of the number of bits in the input data. The second compressed bit ($C_2$), taken in combination with the first bit, indicates which quarter the number of 1s are located in the number of bits in the input data. The third compressed bit ($C_1$), taken in combination with the first and second bits, indicates which eighth the number of 1s are located in the number of bits in the input data. And the fourth compressed bit ($C_0$) determines which, if any, of the final bits are 1s.

When a plurality of compressors are implemented to form a compression tree in a multiplier, the logical 1 values in the compressed partial products output from each compressor are added to yield the product of the multiplier and multiplicand.

The delay threshold comparator of FIG. 4 includes first and second delay elements 210 and 220 coupled to a comparator 230. The first delay element delays a clock signal 240 based on the number of 1s in the input data. The number of data bits input into element 210 is shown as 16 bits. In other embodiments, a different number of bits may be input into this element.

The second delay element delays the same clock signal based on the number of is in a reference value, which preferably has the same number of bits as the data bit input into the first delay element. The reference value corresponds to a respective one of the reference values shown in FIG. 3 used for the binary search operation. (In alternative embodiments, the elements 210 and 220 may delay the clock signal based on the number of 0s in the data and reference inputs). As previously indicated, the bit values in the first stage are generated by coupling predetermined lines to supply and reference potentials. In subsequent stages, the bit values are based on these potentials and the logical values of the compressed bits of preceding stages. The supply and reference potentials may be selectively coupled to the input lines of the second delay element, for example, through an array of switches.

The comparator may be formed from an edge-triggered latch (or flip-flop), which compares the delay on the clock signal output from the first delay element with the delay on the clock signal from the second delay element. If the delayed clock signal from data element 210 arrives ahead of the delayed clock signal from reference element 220, then the input data has more is than the reference value. In this case, the latch captures and outputs a logical 1 as the compressed (or converted) bit value C. Conversely, if the delayed clock signal from the reference element arrives ahead of the delayed clock signal from the data element, then the input data has less 1s than the reference value. In this case, the latch captures and outputs a logical 0 as the compressed (or converted) bit value C. If the delayed clock signals arrive at substantially the same time, the latch captures and outputs a logical 1 for C.

Figure 6:
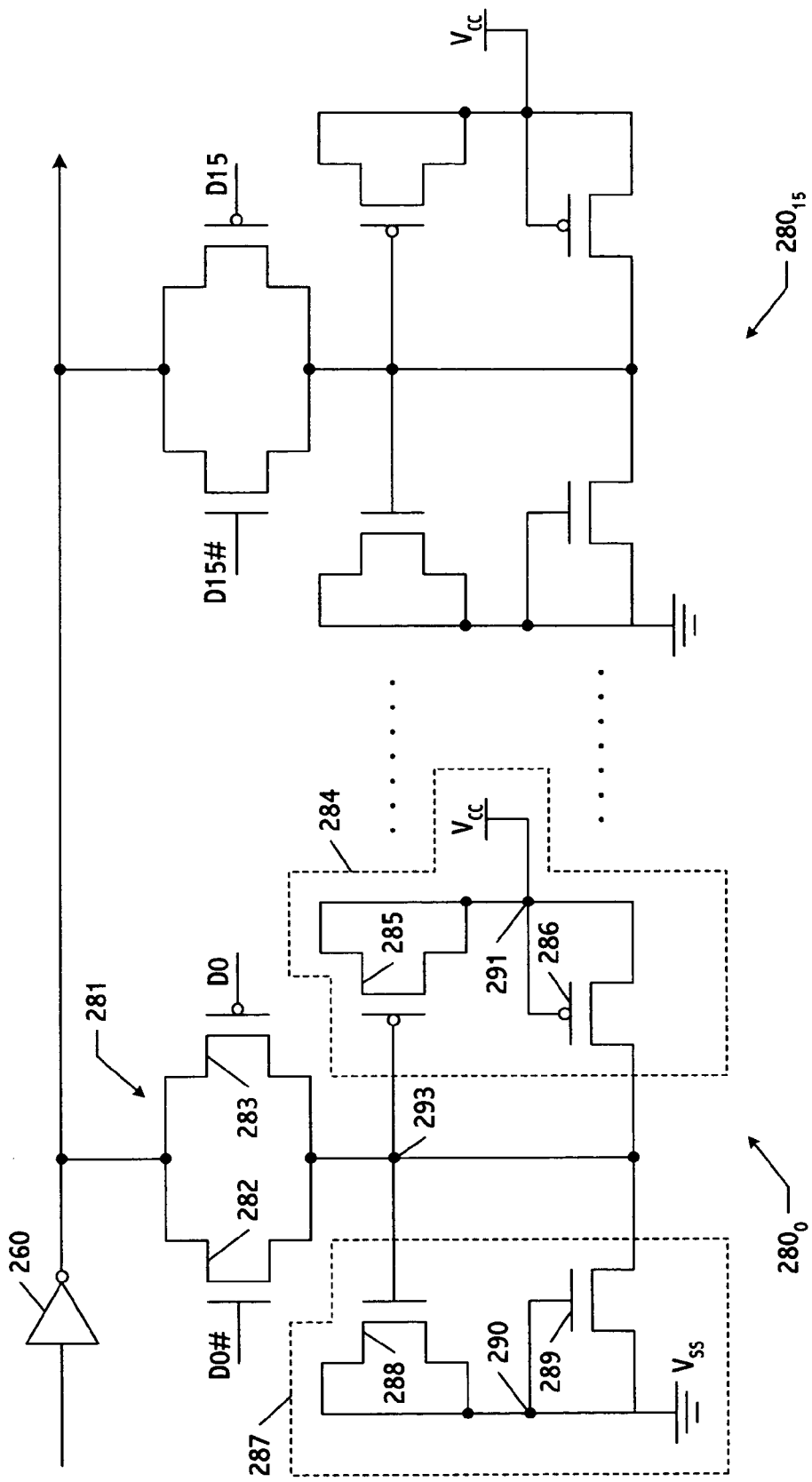
FIG. 6 is a diagram showing one type of circuit that may be used to implement the data delay element in the delay threshold comparator of FIG. 5.

FIG. 6 shows one type of circuit that may be used to implement delay element 210 in the delay threshold comparator. This circuit is formed from delay stages $280_0$ to $280_{15}$, each of which delays the clock signal by an equal increment of time (e.g., 10 ps) based on whether a respective one of the data bits has a logical 1 or 0 value. That is, each delay stage delays the clock signal if its corresponding data bit value is a 0 and does not delay the clock signal if this bit is a 1. An inverter 260 may be included to invert the clock signal prior to the delay stages. The delay in each stage is controlled by varying the load and by using a constant driver. In this example, the inverter serves as the constant driver. The latch compares the aggregate delay of the clock signal to the clock signal delay imposed by the reference value to determine the value of the compressed bit output from the comparator.

Each delay stage includes a pass gate 281, an additive circuit 284, and a subtractive circuit 287. The pass gate is formed from transistors 282 and 283 which have opposite polarity and gates coupled to receive a respective one of the data bits and its complement, namely d0# and d0. The additive circuit includes a supply voltage line $V_{CC}$ coupled to a node 291 between two PMOS transistors 285 and 286. The gate of transistor 285 is coupled to the pass gate through node 293, and its source and drain are connected to node 291. The gate and source of transistor 286 is connected to the intervening node.

The subtractive circuit includes two transistors 288 and 289, the latter of which has a source coupled to reference potential $V_{ss}$. An intervening node 290 is connected to the gate of transistor 289, while the drain of this transistor is connected to the drain of transistor 286 through node 293. The source and drain of transistor 288 are commonly connected to node 290, and its gate is connected to the pass gate through node 293.

In operation, the inverted clock signal is input into the pass gates of the delay stages, and the states of the pass gates are determined based on the values of their respective input data bits. Pass gates which receive a data bit value of zero (e.g., d0=0, d0#=1) are placed in a transmission state and thereby delay the inverted clock signal by a predetermined increment of time. In order to achieve this delay, transistors 285, 286, 288, and 289 operate as load capacitors. If d0 is a logical 0, the pass gate formed from transistors 282 and 283 are turned on and the load is added to the output of the inverter 260. The result is to slow down the clock signal.

Conversely, pass gates which receive data bit values of 1 (e.g., d0=1, d0#=0) are placed in a non-transmissive state, thereby cutting off the load from the inverter. Consequently, no delay is imposed on the inverted clock signal. The resulting aggregate delay from all the stages is compared with the reference delay to generate a compressed bit whose value indicates whether the data was greater than the reference value, for a corresponding level in the compressor.

A compressor formed in this manner may have significant delay, power, and area advantages over compressors using full adder blocks. A compressor formed in accordance with any one of the present embodiments may therefore help to form faster and more efficient multipliers, thereby alleviating the need to perform Booth encoding. Also, while the comparators in the foregoing embodiments have been described as determining whether the number of 1s in the input data are greater than or equal to a corresponding reference value, in alternative embodiments the comparators may determine whether the number of 1s in the input data are less than or equal to a corresponding reference value.

In addition to its multiplier application, a delay threshold comparator as shown in FIGS. 5A-D and 6 may be used as a majority voting circuit in a spatial encoder used, for example, in dynamic bus structures. With their increasing interconnect delays and reduced cycle times, dynamic buses are finding favor over static buses for implementing speed-critical on-chip interconnects. Dynamic buses also offer reduced interconnect delays, because the Miller coupling factor (for determining effective coupling capacitance to neighboring wires) reduces from a worst-case scenario of 2 (for static buses) to 1.

Figure 7:
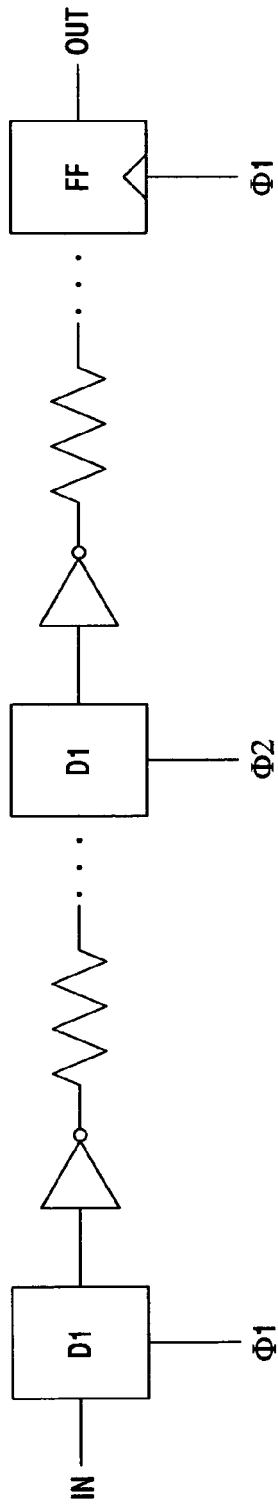
FIG. 7 is a diagram showing a single-cycle dynamic bus without spatial encoding.

FIG. 7 shows a single-cycle dynamic bus implemented in stages, each including a D1-type domino gate and an inverter INV. At the end of the bus, a flip-flop circuit (FF) performs the function of latching the data to an output. The domino gates and the flip-flop circuit operate based on phase control signals $\Phi_1$ and $\Phi_2$. A bus of this type achieves reduced switching capacitance and consequently much lower signal propagation delays.

Figure 8:
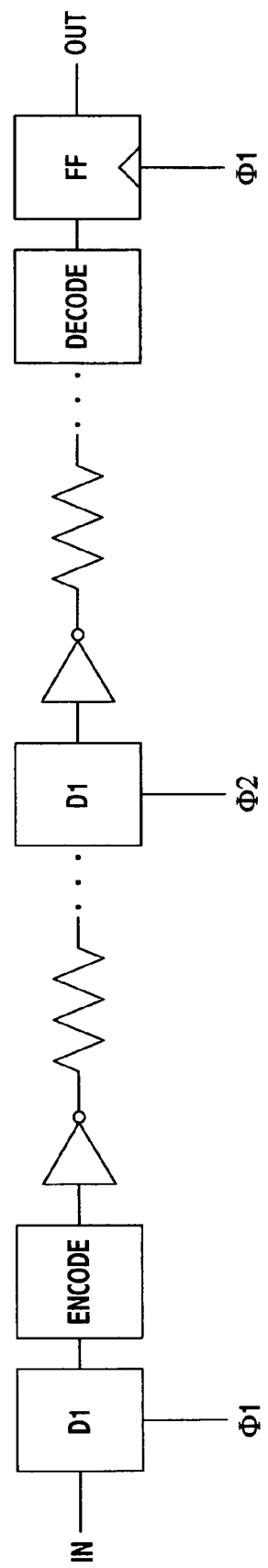
FIG. 8 is a diagram showing a single-cycle dynamic bus which performs spatial encoding.

Dynamic buses can consume considerable power, even when there is low input switching activity of the type found in microprocessor buses. Spatial encoding can reduce the bus activity based on the values of the bus wires. In such an encoding scheme, inverted data values are transmitted if switching occurs in more than half of the bus wires. This limits the number of wires that switch by half. FIG. 8 shows a spatial encoder implemented in a single-cycle encoded dynamic bus.

Figure 9:
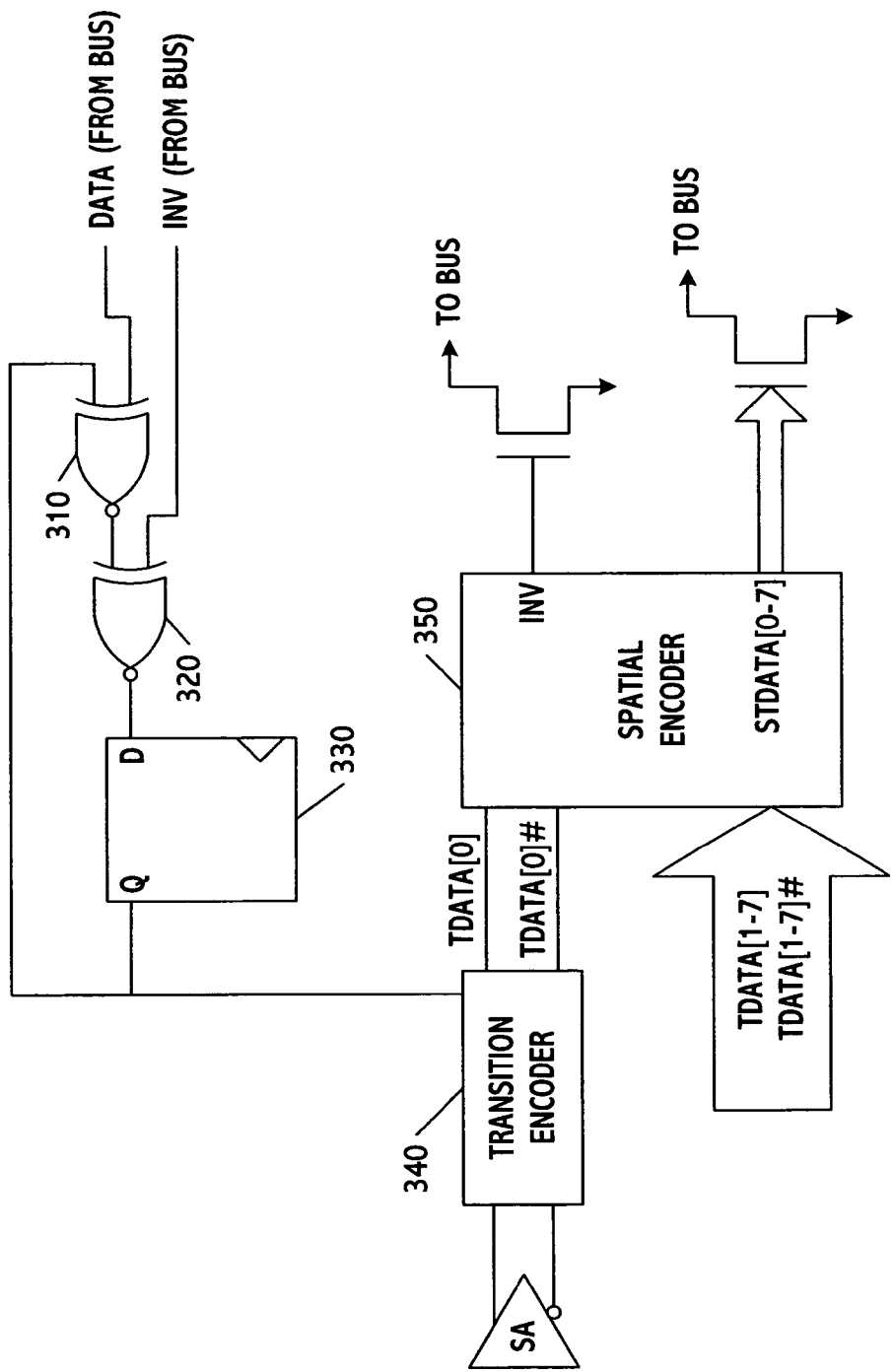
FIG. 9 is a diagram showing a combined spatial encoding and transition encoding circuit for on-chip dynamic cache bus.

FIG. 9 shows a combined spatial encoding and transition encoding circuit that can provide even more significant power savings in an on-chip dynamic cache bus. In this scheme, which can be implemented in the same position as the encoder in FIG. 8, data from the bus is input into a first XOR gate 310 along with the output a D flip-flop 330. The output of the first XOR gate is logically combined with inverted data from the bus in a second XOR gate 320, and the result is input into the D flip-flop. The Q output of the flip-flop is also input into a transition encoder 340, which is connected to a sense amplifier SA which is coupled to a cache storing data to be transferred on the dynamic bus.

The transition encoder forms a first bit of transition data, tdata[0], and its complement, tdata[0]#, based on cache data and the output of the flip-flop. The encoder forms this data by saving the data during a previous cycle in a flip-flop circuit and then performing an XOR operation with the current data from the sense amplifier. The remaining bits tdata[1] through tdata [7] and their complements are generated in an analogous manner as tdata [0] and tdata[0]# using separately transition encoders. When all the transition data bits are formed, they are input into the spatial encoder 350 along with remaining seven bits of transition data, tdata[1-7], and their complements, tdata[1-7]#, respectively formed from corresponding bits of cache data. (The data into XOR gates equals the stdata fed back from the spatial encoder, and this is also true of the inv data output from the spatial encoder).

The spatial encoder generates encoded bits stdata [0-7] and an inverted bit for input on the dynamic bus. The encoder forms these bits using a majority voting circuit, which determines whether more than half of the wires carrying the transition data have switched over a period of time.

Figure 10:
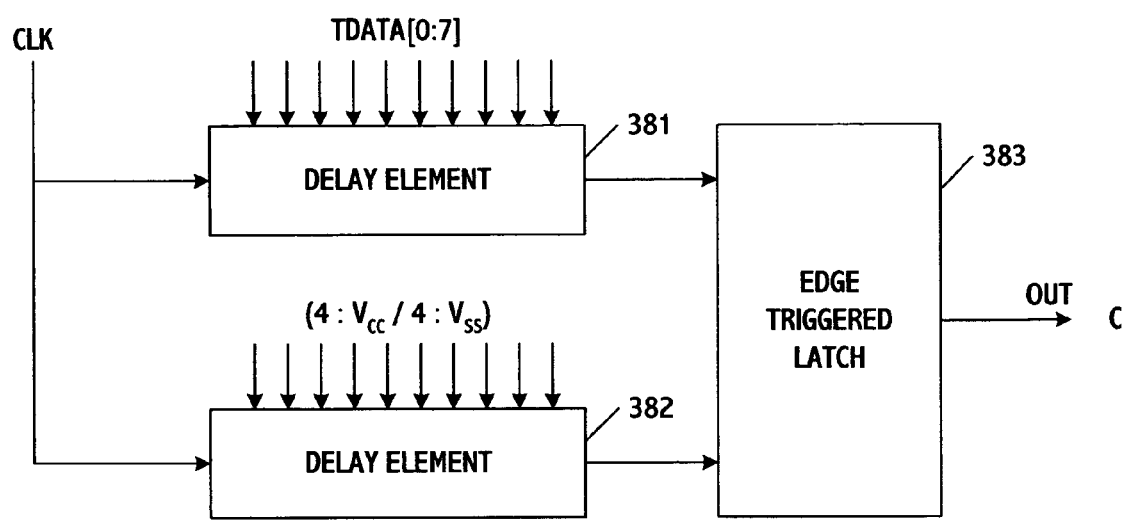
FIG. 10 is a diagram showing a majority voting circuit in accordance with one embodiment of the present invention, which may be used in a spatial encoder for a dynamic bus.

FIG. 10 shows a majority voting circuit in accordance with one embodiment of the present invention which may be used in a spatial encoder for a dynamic bus. The majority voting circuit has a structure similar to FIG. 5, including first and second delay elements 381 and 382 coupled to an edge-triggered latch 383. Unlike FIG. 5, however, the first delay element delays an input clock signal based on how many 1s exist in input transition data tdata[0:7]. More specifically, the first delay element delays the clock signal based on the aggregate number of data lines having a logical 1 value after a switching event has occurred. The second delay element delays the clock signal based on a predetermined reference value. In the example shown, this reference value is 4, generated by coupling four of the input lines to supply voltage $V_{CC}$ and the other four lines to reference potential $V_{SS}$.

The latch compares the delay of the clock signal output from the first delay element to the delay of the clock signal from the second delay element. The delay through each element depends on the number input lines that have a logical 1 value. Based on the number of 1s in the transition data tdata [0:7], the clock signal passed through the first (data) delay element will arrive before or after the clock signal passed through the second (reference) delay element.

Thus, for example, if the transition data has more 1s than the reference number of 1s set in the second delay element, the delayed clock signal output from the first delay element will arrive before the delayed clock signal from the second delay element. Conversely, the delayed clock signal from the first delay element will arrive after the delayed clock signal from the second delay element if the number of 1s in the input transition data is fewer than the reference value. If the number of 1s in the transition data, tdata[0:7] is equal to the reference number, then the delayed clock signals will arrive at the same time.

In order to produce these delays, each of the first and second delay elements may be formed from an appropriate number of delay stages shown in FIG. 6, except that the d0,d0# inputs into the pass gates of the first delay element are replaced with respective transition data bits, tdata[0:7]. Thus, each delay stage will delay the clock signal by a predetermined increment of time if its corresponding data or reference input is a logical 0. The clock signal will not be delayed if the input is a logical 1. The length of the delay of the clock signal, therefore, is directly proportional to the number of 1s in the input, e.g., as the number of 1s increases, the number of 0s decrease along with the delay imposed.

The edge-triggered latch may also correspond in structure to the latch used in FIG. 4. However, instead of outputting compressed data bits, latch 383 outputs a signal indicative of a result of the majority vote. Thus, if the input transition data tdata[0:7] has more 1s than the reference number designed in delay element 382, the latch output may be driven to 1 to indicate that a majority of bus wires have a data value of 1. Of course, if tdata[0:7] has fewer 1s than the reference number, then the latch output is driven to 0 to indicate that a majority of bus wires have a data value of 0. If the number of 1s in the input transition data is equal to the reference number (e.g., 4), then the latch output is given a 0 value. (In this example, a logical 1 may correspond to supply voltage $V_{CC}$ and a logical 0 may correspond to a reference potential $V_{SS}$).

Figure 11:
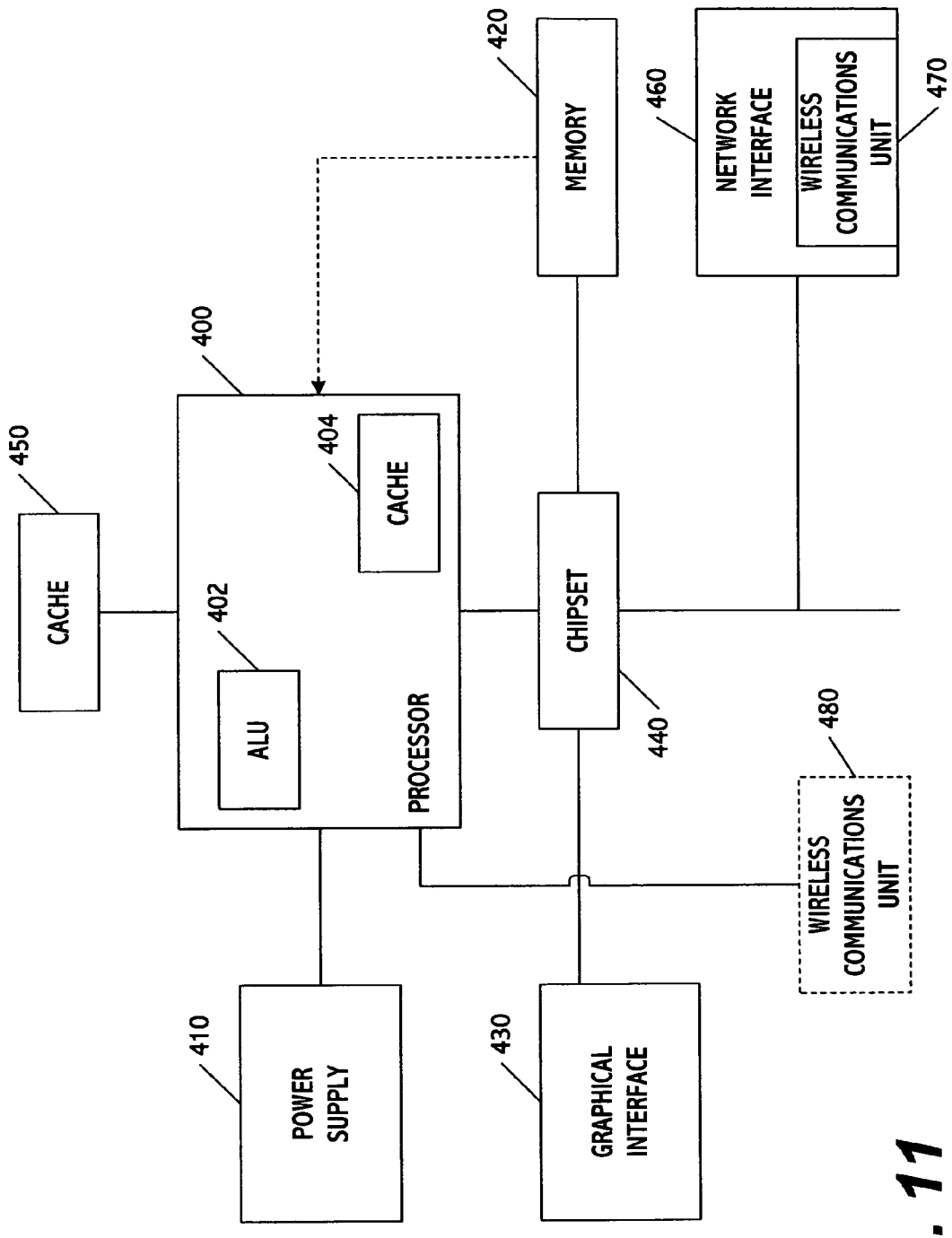
FIG. 11 is a diagram showing a processing system which may include a compressor and/or a majority voting circuit in accordance with any of the embodiments of the present invention.

FIG. 11 shows a system which includes a processor 400, a power supply 410, and a memory 420 which, for example, may be a random-access memory. The processor includes an arithmetic logic unit 402 and an internal cache 404. The system also preferably includes a graphical interface 430, a chipset 440, a cache 450, a network interface 460, and a wireless communications unit 470, which may be incorporated within the network interface. Alternatively, or additionally, the communications unit 480 may be coupled to the processor, and a direct connection may exist between memory 420 and the processor as well.

A compressor or majority voting circuit, or both, in accordance with any of the embodiments of the present invention may be included in any one or more of elements 400, 420, 430, 440, and 450 for a multiplier, spatial encoder, priority encoder, majority voter, or 1 counter application.

The processor may be a microprocessor or any other type of processor, and may be included on a chip die with all or any combination of the remaining features, or one or more of the remaining features may be electrically coupled to the microprocessor die through known connections and interfaces. Also, the connections that are shown are merely illustrative, as other connections between or among the elements depicted may exist depending, for example, on chip platform, functionality, or application requirements.

Another embodiment of the present invention is a computer-readable medium storing a computer program having code sections which implement, either completely or in part, the functional blocks of the method shown in FIG. 5. This medium may, for example, be magnetic or optical storage medium, either permanently or temporarily stored or coupled to a processing system such as but not limited to the system shown in FIG. 11.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention.

For example, in an alternative embodiment of the compressor, the comparators in each compressor stage may determine whether the number of 0s in the input data is greater or less than reference values. In such a case, the circuits forming the compressor may be formed from complementary logic as compared with the logic in the foregoing figures. The scheme based on 0s may be implemented in an alternative embodiment of the majority voting circuit. In addition to variations and modifications in the component parts and/or arrangements, alternative uses will also be apparent to those skilled in the art.

We claim:

1. A circuit, comprising:
   a converter to convert $2^N$-bit data into an N-bit value indicating a number of bits in the data that have a predetermined logical value, the converter including:
   N comparators to generate respective bit values in the N-bit value,
   each comparator to determine whether the number of bits in the data having the predetermined logical value exceeds a respective one of a plurality of reference values, and a first one of the reference values equals a predetermined value and remaining ones of the reference values are based on the bit values output from one or more preceding ones of the N comparators.

2. The circuit of claim 1, wherein each comparator is to output a first bit value when the number of bits in the data having the predetermined logical value exceeds a respective one of the reference values, and is to output a second bit value equal to a complement of the first bit value when the number of bits in the data having the predetermined logical value does not exceed a respective one of the reference values.

3. The circuit of claim 1, wherein each comparator is a delay threshold comparator including:
   a first delay element to delay a signal based on the number of bits in the data having the predetermined logical value;
   a second delay element to delay the signal based on the number of bits in a respective one of the reference values having the predetermined logical value; and
   a compare circuit to generate a respective bit value of the N-bit value based on the delayed signals.

4. The circuit of claim 3, wherein the compare circuit is to generate the respective bit value based on which one of the delayed signals has a shorter delay.

5. The circuit of claim 4, wherein the compare circuit is to set the respective bit value to the predetermined logical value when the delayed signal from first delay element has a shorter delay than the delayed signal from the second delay element, and is to set the respective bit value to a complementary logical value when the delayed signal from the second delay element has a shorter delay than the delayed signal from the first delay element.

6. The circuit of claim 3, wherein the compare circuit includes an edge-triggered latch.

7. The circuit of claim 1, wherein the first one of the reference values (reference value$_1$) equals $2^{N-1}$ and the remaining ones of the reference values are determined by:

$1^{st}$ Stage Reference Value=8

$2^{nd}$ Stage Reference Value=$4+8*C_3$ $3^{rd}$ Stage Reference Value=$2+4*C_2+8*C_3$ $4^{th}$ Stage Reference Value=$1+2*C_1+4*C_2+8*C_3$ where $C_3$, $C_2$, and $C_1$ correspond to leading bit values of the N-bit value when N=4.

8. The circuit of claim 1, wherein the first one of the reference values (reference value$_1$) equals $2^{N-1}$ and the remaining ones of the reference values are determined by:

reference value$_x$=reference value$_{x-1}$±$2^{N-X}$ where X=2, ... ,N and reference value$_{x-1}$ is equal to a preceding reference value, and wherein the term $2^{N-X}$ is added to the preceding reference value if the number of bits in the data having the predetermined logical value equals or exceeds the preceding reference value and is subtracted from the preceding reference value if the number of bits in the data having the predetermined logical value does not exceed the preceding reference value.

9. The circuit of claim 1, wherein the predetermined logical value is a logical 1.

10. The circuit of claim 1, wherein each comparator determines whether the number of bits in the data having the predetermined logical value equals or exceeds a respective one of the reference values.

11. The circuit of claim 10, wherein each comparator is to set a corresponding one of the bit values to a first bit value if the number of bits in the data having the predetermined logical value equals or exceeds a respective one of the reference values, and is to set the corresponding one of the bit values to a second bit value which is complementary to the first bit value if the number of bits in the data having the predetermined logical value is less than a respective one of the reference values.

12. The circuit of claim 1, wherein each comparator is to determine whether the number of bits in the data having the predetermined logical value is less than or equal to a respective one of the reference values.

13. The circuit of claim 12, wherein each comparator is to set a corresponding one of the bit values to a first logical value if the number of bits in the data having the predetermined logical value is greater than a respective one of the reference values, and is to set the corresponding one of the bit values to a second logical value complementary to the first logical value if the number of bits in the data having the predetermined logical value is less than or equal to a respective one of the reference values.

14. The circuit of claim 1, further comprising:
a translator; and
additional converters to convert different $2^N$-bit data into respective N-bit values, wherein the translator is to output a product of two binary numbers based on the N-bit values generated by the converters.

15. A circuit, comprising:
a converter to convert $2^N$-bit data into an N-bit value indicating a number of bits in the data that have a predetermined logical value, the converter including:
N comparators to generate respective bit values in the N-bit value,
each comparator to determine whether the number of bits in the data having the predetermined logical value exceeds a respective one of a plurality of reference values, wherein a first one of the reference values equals a predetermined value and remaining ones of the reference values are based on the bit values output from one or more preceding ones of the N comparators, wherein each comparator is a delay threshold comparator including:
a first delay element to delay a signal by a first amount based on a number of bits in a data value having a predetermined logical value;
a second delay element to delay the signal by a second amount different from the first amount based on a number of bits in a reference value having the predetermined logical value; and
a comparator to generate a bit value based on a difference in delay between the delayed signals output from the first delay element and the second delay element.

16. The circuit of claim 15, wherein the comparator is to set the bit value to the predetermined logical value based on which one of the delayed signals has a shorter delay.

17. The circuit of claim 15, wherein the comparator includes an edge-triggered latch.

18. The circuit of claim 16, wherein the comparator is to set the bit value to the predetermined logical value when the delayed signal from first delay element has a shorter delay than the delayed signal from the second delay element, and is to set the bit value to a complementary logical value when the delayed signal from the second delay element has a shorter delay than the delayed signal from the first delay element.

19. The circuit of claim 15, wherein the data value corresponds to transition data generated by a transition encoder, and wherein the bit value generated by the comparator corresponds to a majority voting result.

20. The circuit of claim 15, wherein the number of bits in the reference value having the predetermined logical value is a fixed number.

21. The circuit of claim 15, wherein the signal is a clock signal.

22. A conversion method, comprising:
(a) determining whether a $2^N$-bit data value has more bits of a predetermined logical value than a reference value using a comparator circuit of a processor;
(b) generating a converted bit based on a result of (a) using said comparator;
(c) setting the reference value based on a value of the converted bit; and
(d) repeating (a)-(c) N−1 times, wherein the N converted bits generated by (a)-(d) are indicative of a total number of bits in the $2^N$-bit data value that corresponds to the predetermined logical value, wherein said processor performs a predetermined operation based on the N converted bits generated by (a)-(d).

23. The method of claim 22, wherein the reference value first used in (a) is a predetermined value and the set reference values generated by performing (c) N−1 times are based on the values of one or more preceding converted bits.

24. The method of claim 22, wherein the converted bit values are set to a logical value when the $2^N$-bit data value has more bits of the predetermined logical value than a corresponding reference value, and are set to a complementary logical value when the $2^N$-bit data value has fewer bits of the predetermined logical value than a corresponding reference value.

25. The method of claim 22, wherein each repetition of (a) includes:
(e) delaying a signal based on the number of bits in the $2^N$-bit data value having the predetermined logical value; and
(f) delaying the signal based on the number of bits in a respective reference value equal to the predetermined logical value, and wherein (b) includes:
(g) determining a logical value of the converted bit based on the delayed signals.

26. The method of claim 25, wherein the logical value of the converted bit is determined based on which delayed signal has a shorter delay.

27. The method of claim 26, wherein the logical value of the converted bit is set to a first logical value when the delayed signal from (e) has a shorter delay than the delayed signal from (f), and is set to a second logical value which is a complement of the first logical value when the delayed signal from (f) has a shorter delay than the delayed signal from (e).

28. A computer program embodied within a computer-readable medium, wherein different code sections are executed by a processor to perform operations comprising:
(a) determining whether a $2^N$-bit data value has more bits of a predetermined logical value than a reference value;
(b) generating a converted bit based on a result of (a);

(c) setting the reference value based on a value of the converted bit; and (d) repeating (a)-(c) N−1 times, wherein the N converted bits generated by (a)-(d) are indicative of a total number of bits in the $2^N$-bit data value that corresponds to the predetermined logical value, wherein the processor includes a comparator circuit to execute code sections that perform operations (b) and (c).

29. A system, comprising:

a first circuit; and a second circuit having a converter to convert $2^N$-bit data into an N-bit value indicating a number of bits in the data that have a predetermined logical value, the converter including:

N comparators to generate respective bit values in the N-bit value, each comparator to determine whether the number of bits in the data having the predetermined logical value exceeds a respective one of a plurality of reference values, a first one of the reference values equals a predetermined value and remaining ones of the reference values based on the bit values output from one or more preceding ones of the N comparators, and the second circuit is to perform a logical operation based on the N-bit value output from the first circuit.

30. The system of claim 29, wherein the first circuit is selected from the group consisting of a processor, a memory, a chipset, a graphical interface, a cache, a network interface, and a wireless communications unit.

* * * * *